(12) United States Patent
Meyer et al.

(10) Patent No.: US 7,402,293 B2
(45) Date of Patent: Jul. 22, 2008

(54) SURFACE-MODIFIED, AEROGEL-TYPE STRUCTURED SILICA

(75) Inventors: Jürgen Meyer, Stockstadt (DE); Horst Zeizinger, Hanau (DE); Manfred Ettlinger, Karlstein (DE); Hans-Dieter Christian, Alzenau (DE)

(73) Assignee: Degussa AG, Hanau (DE)

( * ) Notice: Subject to any disclaimer, the term of this patent is extended or adjusted under 35 U.S.C. 154(b) by 739 days.

(21) Appl. No.: 10/732,237

(22) Filed: Dec. 11, 2003

(65) Prior Publication Data

US 2004/0120876 A1 Jun. 24, 2004

Related U.S. Application Data

(60) Provisional application No. 60/433,955, filed on Dec. 18, 2002.

(51) Int. Cl.
*C01B 33/12* (2006.01)
(52) U.S. Cl. ........................... 423/335; 423/338
(58) Field of Classification Search ................. 423/335, 423/338
See application file for complete search history.

(56) References Cited

U.S. PATENT DOCUMENTS

| | | | |
|---|---|---|---|
| 2,805,958 A | | 9/1957 | Bueche et al. |
| 3,453,127 A | * | 7/1969 | Marotta et al. .......... 106/169.55 |
| 4,097,302 A | * | 6/1978 | Cohen et al. ................. 106/312 |
| 4,150,101 A | | 4/1979 | Schmidt et al. |
| 4,208,316 A | | 6/1980 | Nauroth et al. |
| 5,959,005 A | | 9/1999 | Hartmann et al. |
| 2001/0034375 A1 | | 10/2001 | Schwertfeger et al. |

FOREIGN PATENT DOCUMENTS

| | | |
|---|---|---|
| CA | 1033640 | 6/1978 |
| DE | 2403783 A1 | 1/1974 |
| DE | 24 14 478 | 10/1975 |
| EP | 0 808 880 B1 | 4/1997 |
| GB | 723427 | 2/1955 |
| GB | 791711 | 3/1958 |
| GB | 793594 | 4/1958 |
| GB | 805102 | 11/1958 |
| GB | 957108 | 5/1964 |
| WO | WO 98/23366 | 6/1998 |
| WO | WO 99/36355 A2 | 7/1999 |

OTHER PUBLICATIONS

Hiroki, Kodama, Patent Abstract of Japan, "Matte Flux for Soldering", Publication No. 05337685, Publication date Dec. 21, 1993.
International Preliminary Examination Report, dated Sep. 12, 2005, issued for corresponding PCT Application No. PCT/EP03/12382.

\* cited by examiner

*Primary Examiner*—Edward M Johnson
(74) *Attorney, Agent, or Firm*—Venable LLP

(57) ABSTRACT

A surface-modified, aerogel-type, structured silica is produced by spraying an aerogel-type, structured silica with a silanizing agent, post-mixing and conditioning. It can be used as a flatting agent.

7 Claims, No Drawings

SURFACE-MODIFIED, AEROGEL-TYPE STRUCTURED SILICA

This application claims the benefit of U.S. Provisional Application No. 60/433,955 filed Dec. 18, 2002.

The invention concerns a surface-modified, aerogel-type, structured silica.

Aerogels are understood to be silica gels having a low bulk density (approx. 20 to 50 g/l) and high macroporosity (DBP numbers from 200 to 400). Due to the contraction effect described by R. Iler, which leads to a collapse of the pore structure during the drying of silica gels from the aqueous phase, silica aerogels are only obtainable by the method described by Kistler in U.S. Pat. No. 2,249,767. To this end Kistler partially dewaters silica sols with alcohols and then dries the water-containing alcogel in an autoclave by expansion under supercritical conditions.

In this way he obtains particularly loosely constructed structures consisting of the primary particles of the silica sol, which display high volume values in the macropore range (>300 Å) combined with a very low apparent density (bulk density).

Depending on their degree of porosity and bulk density, these substances, which are classed as an aerogel, are used as fillers, support silicas, flatting agents, thickeners, etc. The necessary use of organic solvents and the supercritical drying to be performed in an autoclave make the process for producing these aerogels both technically complicated and expensive.

It is known that the stated disadvantages of the methods available until now for the production of aerogels can be avoided if primary particles of pyrogenically produced silicas are used in place of the silica sol particles and recovery from the liquid phase is omitted.

The primary particles of pyrogenic silica occur in beds, loosely associated by means of electrostatic and van der Waals forces.

They agglomerate into flocs, which display a high air content and thus have a very high apparent pore volume and correspondingly a low bulk density.

A bed of these flocs is best described as an air dispersion. The flocs are unstable, however, and unlike the secondary particles in Kistler aerogels they are broken down into primary particles under the slightest mechanical loading.

The use of aerogel-type structured silica as a flatting agent in surface coatings, such as paints for example, is known (DE 24 14 478).

The invention provides an aerogel-type, structured silica which is characterized in that it is surface-modified.

An aerogel-type, structured silica according to DE 2 414 878 for example can be used as the starting silica.

The starting silica for the surface modification can also be an aerogel-type structured silica having the following material parameters:

BET surface area between 80 and 450 $m^2/g$
Bulk density between 10 and 60 g/l
DBP number between 200 and 400
pH from 6 to 8

The aerogel-type structured silica can be produced by incorporating 5-50 wt. % water into air-dispersed pyrogenic silica with uniform dispersion and drying the powdered mixture that is obtained.

Since the volume of silica reduces only slightly as the water is incorporated, it can be assumed that the originally existing association of the primary particles of the air-dispersed pyrogenic silica is substantially retained. The loading with water probably leads to a partial dissolution of the silica surface, such that dissolved silica is present here.

During the subsequent drying process this bonds the primary particles to their points of contact.

Selective loading with water and subsequent drying from a pyrogenic silica thus produces a dispersible substance corresponding to the Kistler aerogels, having a high macropore volume and very low apparent density (bulk density).

It was also established that the apparent structure existing before incorporation of the water, determined by the packing density of the pyrogenic silica in air and expressed by its apparent density (bulk density), has a marked influence on the product that can be obtained by the process according to the invention: the more voluminous the starting product, the more voluminous the end product.

Pyrogenically produced silica is known from Ullmanns Enzyklopädie der technischen Chemie $4^{th}$ Edition, Volume 21, page 462 ff.

It can be produced by flame hydrolysis of volatile or evaporable silicon compounds, such as e.g. $SiCl_4$, methyl trichlorosilane and others, in an oxyhydrogen flame.

It has proven convenient to use pyrogenic silica with a bulk density of 10 to 60, preferably 15 to 30, in particular around 20 g/l, to produce the products according to the invention.

It has also proven advantageous to choose pyrogenic silica with large surface areas and hence small primary particles. According to a favorable embodiment of the process according to the invention, silica with BET surface areas of between 100 and 480, in particular 250 to 300 $m^2/g$, is used.

Complete wetting of the primary particles can be achieved by incorporating as little as 5 to 20, in particular 7 to 15 wt. % water into the silica with uniform distribution. Since the water that is incorporated is to be removed again by drying, it is desirable for economic reasons to minimize the amount of water. The amount required depends to a certain extent on the type of incorporation, however.

Structure formation by the process according to the invention can be noticeably promoted if basic-reacting compounds, such as e.g. ammonia, sodium hydroxide, potassium hydroxide, water-soluble amines, water glass or the like are added to the water. The amounts to be added are conveniently chosen such that a pH of 7 to 14, preferably 8 to 12, in particular 10 to 11, is established in the water.

The alkalis used act as a solution aid for silica and bring about an increase in the macroporosity of the process products.

Instead of alkaline compounds, free silica or hydrolytic silica and/or substances that release alkali can also be added to the water.

Free silica produced for example by acidification or ionic exchange of silicate solutions or by hydrolytic cleavage of organosilicon compounds, for example tetramethyl silicate, likewise promotes structure formation.

A substance that releases alkali and silica hydrolytically is sodium methyl siliconate, for example.

The water can be uniformly dispersed in the silica by dropping or spraying it into the silica, which is kept in motion by mixing, at silica temperatures of between 20 and 100, preferably 40 to 70, in particular 50 to 60° C. The mixing motion is conveniently achieved by stirring.

A further variant of water incorporation consists of spraying the water into a mass flux of silica fluidized in a downpipe for example.

It has further proven advantageous to perform the water loading at moderately elevated temperatures. This can be done by preheating either the water to be incorporated or the silica or both components. Thus the water to be incorporated can be at a temperature of between 20 and 100, preferably 50 to 100, in particular 90 to 100° C.

Structure formation can also be promoted by brief steaming of the loaded silica in a closed room. Steaming leads to a particularly good water distribution. It has proven favorable in this respect to steam the water-loaded silica before drying for approx. 5 to 60, preferably 10 to 30, in particular around 20 minutes, in a closed vessel at temperatures up to the boiling point of water, preferably 50 to 80, in particular around 60° C.

A further possibility for improving the water distribution consists of grinding the water-loaded silica in a pin mill or air jet mill for example.

It is then dried, whereby the preformed structure is presumably fixed by primary particles that are partially dissolved at the surface or that are coated at the surface with free silica.

The type of drying is not of critical importance. The mixture of silica and water that has been produced, which in phenomenological terms always resembles a dry powder, can be dried for example in chamber, disk, Büttner, flow or microwave dryers. However, the water-loaded silica can also be ground and dried simultaneously, avoiding a separate process stage, in a steam jet or air jet mill.

If the powdered mixture obtained after loading with water is dried separately, this can be followed by dry grinding in a pin mill or air jet mill.

The invention also provides a process for the production of the surface-modified, aerogel-type, structured silica, which is characterized in that an aerogel-type, structured silica is prepared, optionally sprayed first with water or with acidified water and then with the silanizing agent, which can optionally be dissolved in a solvent, post-mixed and the mixture conditioned.

Ethanol for example can be used as the solvent for the silanizing agent. Conditioning can be performed batchwise in a drying oven, for example, or continuously. Conditioning can optionally be performed under a protective gas atmosphere.

Once spraying has been completed, post-mixing is continued for a further 15 to 30 min and conditioning then performed for 1 to 4 h at 100 to 400° C.

The water used can be acidified with an acid, for example hydrochloric acid, to a pH of 7 to 1.

Silanization can be performed by spraying the silica with the silanizing agent at room temperature and then subjecting the mixture to a thermal treatment at a temperature of 105 to 400° C. for a period of 1 to 6 h.

An alternative method for silanizing the silica can be performed by treating the silica with the silanizing agent in vapor form and then subjecting the mixture to a thermal treatment at a temperature of 200 to 800° C. for a period of 0.5 to 6 h.

The thermal treatment can be performed under protective gas, such as nitrogen for example.

Silanization can be performed in heatable mixers and dryers with sprayers, on a continuous or batchwise basis. Examples of suitable devices include plough mixers, disk dryers, fluidized bed or moving bed dryers.

Halosilanes, alkoxysilanes, silazanes and/or siloxanes can be used for surface modification or silanization. Several of these compounds can also be used as a mixture or successively.

The following substances in particular can be used:
a) organosilanes of the type $(RO)_3Si(C_nH_{2n+1})$ and $(RO)_3Si(C_nH_{2n-1})$
   R=alkyl, such as e.g. methyl, ethyl, n-propyl, i-propyl, butyl
   n=1-20
b) Organosilanes of the type $R'_x(RO)_ySi(C_nH_{2n+1})$ and $(RO)_3Si(C_nH_{2n+1})$
   R=alkyl, such as e.g. methyl, ethyl, n-propyl, i-propyl, butyl
   R'=alkyl, such as e.g. methyl, ethyl, n-propyl, i-propyl, butyl
   R'=cycloalkyl
   n=1-20
   x+y=3
   x=1,2
   y=1,2
c) Haloorganosilanes of the type $X_3Si(C_nH_{2n+1})$ and $X_3Si(C_nH_{2n-1})$
   X=Cl, Br
   n=1-20
d) Haloorganosilanes of the type $X_2(R')Si(C_nH_{2n+1})$ and $X_2(R')Si(C_nH_{2n-1})$
   X=Cl, Br
   R'=alkyl, such as e.g. methyl, ethyl, n-propyl, i-propyl, butyl
   R'=cycloalkyl
   n=1-20
e) Haloorganosilanes of the type $X(R')_2Si(C_nH_{2n+1})$ and $X(R')_2Si(C_nH_{2n-1})$
   X=Cl, Br
   R'=alkyl, such as e.g. methyl, ethyl, n-propyl, i-propyl, butyl
   R'=cycloalkyl
   n=1-20
f) Organosilanes of the type $(RO)_3Si(CH_2)_m$—R'
   R=alkyl, such as methyl, ethyl, propyl
   m=0,1-20
   R'=methyl, aryl (e.g. —$C_6H_5$, substituted phenyl radicals)
      —$C_4F_9$, $OCF_2$—CHF—$CF_3$, —$C_6F_{13}$, —O—$CF_2$—$CHF_2$
      —$NH_2$, —$N_3$, —SCN, —CH=$CH_2$, —NH—$CH_2$—$CH_2$—$NH_2$,
      —N—$(CH_2$—$CH_2$—$NH_2)_2$
      —OOC$(CH_3)$C=$CH_2$
      —$OCH_2$—CH(O)$CH_2$
      —NH—CO—N—CO—$(CH_2)_5$
      —NH—COO—$CH_3$, —NH—COO—$CH_2$—$CH_3$,
      —NH—$(CH_2)_3$Si$(OR)_3$
      —$S_x$—$(CH_2)_3$Si$(OR)_3$
      —SH
      —NR'R''R''' (R'=alkyl, aryl; R''=H, alkyl, aryl; R'''=H, alkyl, aryl, benzyl, $C_2H_4$NR''''R''''' where R''''=A, alkyl and R'''''=H, alkyl)
g) Organosilanes of the type $(R'')_x(RO)_ySi(CH_2)_m$—R'
   R''=alkyl x+y=3
      =cycloalkyl x=1,2
      y=1,2
      m=0,1 to 20
   R'=methyl, aryl (e.g. —$C_6H_5$, substituted phenyl radicals)
      —$C_4F_9$, —$OCF_2$—CHF—$CF_3$, —$C_6F_{13}$, —O—$CF_2$—$CHF_2$
      —$NH_2$, —$N_3$, —SCN, —CH=$CH_2$, —NH—$CH_2$—$CH_2$—$NH_2$,
      —N—$(CH_2$—$CH_2$—$NH_2)_2$
      —OOC$(CH_3)$C=$CH_2$
      —$OCH_2$—CH(O)$CH_2$
      —NH—CO—N—CO—$(CH_2)_5$
      —NH—COO—$CH_3$, —NH—COO—$CH_2$—$CH_3$,
      —NH—$(CH_2)_3$Si$(OR)_3$
      —$S_x$—$(CH_2)_3$Si$(OR)_3$
      —SH—

—NR'R"R'" (R'=alkyl, aryl; R"=H, alkyl, aryl; R'"=H, alkyl, aryl, benzyl, $C_2H_4NR''''$ R'''' where R''''=A, alkyl and R'''''=H, alkyl)

h) Haloorganosilanes of the type $X_3Si(CH_2)_m$—R'
X=Cl, Br
m=0,1-20
R'=methyl, aryl (e.g. —$C_6H_5$, substituted phenyl radicals)
—$C_4F_9$, —$OCF_2$—CHF—$CF_3$, —$C_6F_{13}$, —O—$CF_2$—$CHF_2$
—$NH_2$, —$N_3$, —SCN, —CH=$CH_2$,
—NH—$CH_2$—$CH_2$—$NH_2$
—N—($CH_2$—$CH_2$—$NH_2$)$_2$
—OOC($CH_3$)C=$CH_2$
—$OCH_2$—CH(O)$CH_2$
—NH—CO—N—CO—($CH_2$)$_5$
—NH—COO—$CH_3$, —NH—COO—$CH_2$—$CH_3$,
—NH—($CH_2$)$_3$Si(OR)$_3$
—$S_x$—($CH_2$)$_3$Si(OR)$_3$
—SH i) Haloorganosilanes of the type (R)$X_2$Si($CH_2$)$_m$—R'
X=Cl, Br
R=alkyl, such as methyl, ethyl, propyl
m=0,1-20
R'=methyl, aryl (e.g. —$C_6H_5$, substituted phenyl radicals)
—$C_4F_9$, —$OCF_2$—CHF—$CF_3$, —$C_6F_{13}$, —O—$CF_2$—$CHF_2$
—$NH_2$, —$N_3$, —SCN, —CH=$CH_2$,—NH—$CH_2$—$CH_2$—$NH_2$,
—N—($CH_2$—$CH_2$—$NH_2$)$_2$
—OOC($CH_3$)C=$CH_2$
—$OCH_2$—CH(O)$CH_2$
—NH—CO—N—CO—($CH_2$)$_5$
—NH—COO—$CH_3$, —NH—COO—$CH_2$—$CH_3$,
—NH—($CH_2$)$_3$Si(OR)$_3$, whereby R can be methyl, ethyl, propyl, butyl
—$S_x$—($CH_2$)$_3$Si(OR)$_3$, whereby R can be methyl, ethyl, propyl, butyl
—SH j) Haloorganosilanes of the type (R)$_2$X Si($CH_2$)$_m$—R'
X=Cl, Br
R=alkyl
m=0,1-20
R'=methyl, aryl (e.g. —$C_6H_5$, substituted phenyl radicals)
—$C_4F_9$, —$OCF_2$—CHF—$CF_3$, —$C_6F_{13}$, —O—$CF_2$—$CHF_2$
—$NH_2$, —$N_3$, —SCN, —CH=$CH_2$, —NH—$CH_2$—$CH_2$—$NH_2$,
—N—($CH_2$—$CH_2$—$NH_2$)$_2$
—OOC($CH_3$)C=$CH_2$
—$OCH_2$—CH(O) $CH_2$
—NH—CO—N—CO—($CH_2$)$_5$
—NH—COO—$CH_3$, —NH—COO—$CH_2$—$CH_3$,
—NH—($CH_2$)$_3$Si(OR)$_3$
—$S_x$—($CH_2$)$_3$Si(OR)$_3$
—SH k) Silazanes of the type

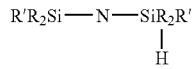

R=alkyl, vinyl, aryl
R'=alkyl, vinyl, aryl l) Cyclic polysiloxanes of the type D 3, D 4, D 5, whereby D 3, D 4 and D 5 are understood to be cyclic polysiloxanes with 3, 4 or 5 units of the type —O—Si($CH_3$)$_2$— e.g. octamethyl cyclotetrasiloxane=D 4

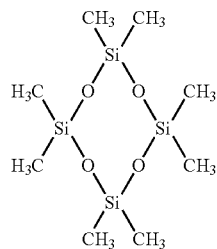

m) Polysiloxanes or silicone oils of the type

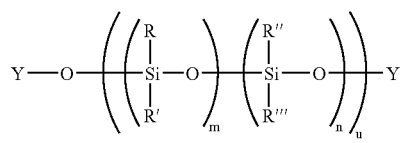

m=0,1,2,3, ... ∞
n=0,1,2,3, ... ∞
u=0,1,2,3, ... ∞
Y=$CH_3$, H, $C_nH_{2n+1}$ n=1-20
Y=Si($CH_3$)$_3$, Si($CH_3$)$_2$H Si($CH_3$)$_2$OH, Si($CH_3$)$_2$(O$CH_3$) Si($CH_3$)$_2$($C_nH_{2n+1}$) n=1-20
R=alkyl, such as $C_nH_{2n+1}$, whereby n=1 to 20, aryl, such as phenyl and substituted phenyl radicals, ($CH_2$)$_n$—$NH_2$, H
R'=alkyl, such as $C_nH_{2n+1}$, whereby n=1 to 20, aryl, such as phenyl and substituted phenyl radicals, ($CH_2$)$_n$—$NH_2$, H
R"=alkyl, such as $C_nH_{2n+1}$, whereby n=1 to 20, aryl, such as phenyl and substituted phenyl radicals, ($CH_2$)$_n$—$NH_2$, H
R'"=alkyl, such as $C_nH_{2n+1}$, whereby n=1 to 20, aryl, such as phenyl and substituted phenyl radicals, ($CH_2$)$_n$—$NH_2$, H 3-Methacryloxypropyl trimethoxysilane can preferably be used.

Trimethoxyoctyl silane and/or hexamethyl disilazane can preferably used as the silanizing agent.

3-Glycidyloxypropyl trimethoxysilane can preferably be used as the silanizing agent.

The following substances in particular can be used as silazanes:

Silazanes of the type

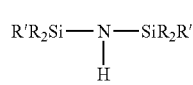

R=alkyl
R'=alkyl, vinyl
as well as hexamethyl disilazane for example.
Dimethyl polysiloxane can be used in particular.
The surface-modified, aerogel-type, structured silica according to the invention can be used as a flatting agent in surface coatings such as e.g. paints.

EXAMPLES

Production of the Silica According to the Invention

An aerogel-type structured silica with the following physico-chemical properties is used:

| | |
|---|---:|
| BET surface area $m^2/g$: | 264 |
| pH: | 6.8 |
| Loss on drying %: | 2.3 |
| Ignition loss %: | 2.4 |
| Compacted bulk density g/l: | 48 |
| Carbon content %: | 0 |
| DBF number %: | 380 |

This aerogel-type structured silica is placed in a mixer and optionally sprayed first with water and then with the silanizing agent with intensive mixing. On completion of spaying, post-mixing is continued for a further 15 min and conditioning then performed in a drying oven.

The parameters for producing the silica according to the invention are set out in Table 1 and the physico-chemical data in Table 2.

TABLE 1

Production of the silica according to the invention

| Example | Silanizing agent* | Parts SA**/ 100 parts sil*** | Parts $H_2O$/ 100 parts sil*** | Cond. temp. [° C.] | Cond. time [h] |
|---|---|---|---|---|---|
| 1 | AMEO | 10 | 0 | 120 | 2 |
| 2 | AMEO | 20 | 2 | 120 | 2 |
| 3 | MEMO | 10 | 2 | 120 | 2 |
| 4 | MEMO | 20 | 2 | 120 | 2 |
| 5 | OCTMO | 10 | 2 | 120 | 2 |
| 6 | OCTMO | 20 | 2 | 120 | 2 |
| 7 | HMDS | 10 | 2 | 120 | 2 |
| 8 | HMDS | 20 | 2 | 120 | 2 |
| 9 | HMDS | 10 | 0 | 120 | 2 |
| 10 | HMDS | 20 | 0 | 120 | 2 |
| 11 | GLYMO | 10 | 0 | 120 | 2 |
| 12 | GLYMO | 20 | 2 | 120 | 2 |

*Silanizing agent:
AMEO = 3-aminopropyl triethoxysilane
MEMO = 3-methacryloxypropyl trimethoxysilane
OCTMO = octyl trimethoxysilane
HMDS = hexamethyl disilazane
GLYMO = glycidyl oxypropyl trimethoxysilane
**SA = silanizing agent
***sil = silica

TABLE 2

Physico-chemical data for the silica according to the invention

| Example | LOD [%] | IL [%] | pH | DBP [%] | CBD [g/l] | BET [$m^2$/g] | C [%] |
|---|---|---|---|---|---|---|---|
| 1 | 1.2 | 4.3 | 9.1 | 339 | 35 | 205 | 2.0 |
| 2 | 0.8 | 6.2 | 10.2 | — | 38 | — | 3.4 |
| 3 | 0.6 | 8.2 | 5.3 | 312 | 37 | 184 | 3.7 |
| 4 | 1.8 | 12.3 | 5.5 | 341 | 39 | — | 6.8 |
| 5 | 0.8 | 8.8 | 5.1 | 350 | 33 | — | 4.8 |
| 6 | 2.4 | 13.0 | 5.4 | 320 | 36 | — | 8.8 |
| 7 | 1.0 | 2.5 | 6.6 | 329 | 36 | — | 2.0 |
| 8 | 0.4 | 2.8 | 6.4 | 331 | 46 | — | 2.6 |
| 9 | 1.0 | 2.6 | 7.1 | 317 | 40 | — | 2.1 |
| 10 | 1.0 | 2.6 | 6.8 | 327 | 42 | — | 2.2 |
| 11 | 0.6 | 5.0 | 6.0 | — | 40 | — | 2.9 |
| 12 | 0.5 | 9.7 | 6.2 | 321 | 44 | — | 5.5 |

Applicational Advantages

The silicas according to the invention are tested in two paint systems. In paint system 1 and paint system 2 the following advantages are demonstrated:
- easier and faster to incorporate
- reduced thickening action, as a result of which lower-viscosity paints are possible
- reduced thickening action, as a result of which a higher flatting agent concentration is possible.

In paint system 2 the following advantages are also established:
- improved transparency with comparable flatting
- improved chemical resistance with comparable flatting Paint system 1 has the following composition:
Weighing factor: 25

| Raw material | Control number | Amount | Original weighed amount |
|---|---|---|---|
| Laromer PO 83 F | | 83.00 | 2075.00 |
| TPGDA | | 12.00 | 300.00 |
| Irgacure 500 | | 4.00 | 100.00 |
| Dow Corning PA 57 | | 1.00 | 25.00 |
| Total | | 100.00 | 2500.00 |

| | | |
|---|---|---|
| Laromer PO 83 F | amine-modified oligoether acrylate | BASF |
| TPGDA | tripropylene glycol diacrylate | BASF |
| Irgacure 500 | photoinitiator (mixture of benzophenone and 1-hydroxycyclohexyl phenyl ketone) | Ciba |
| Dow Corning PA 57 | silicone-containing flow-control agent | Dow Corning |

Paint system 2 has the following composition:
Weighing factor: ×40

| Raw material | Content | Amount | Original weighed amount |
|---|---|---|---|
| Butyl acetate 98% | | 8.30 | 332.00 |
| Ethoxypropyl acetate | | 16.50 | 660.00 |
| Desmophen 800 | | 15.00 | 600.00 |
| Desmophen 1100 | | 20.00 | 800.00 |
| CAB 381-0.5 | 10.00% in butyl acetate 98% | 3.00 | 120.00 |
| Mowilith 20 | 50.00% in ethyl acetate | 3.00 | 120.00 |
| Baysilone OL 17 | 10.00% in xylene | 0.10 | 4.00 |
| BYK 361 | | 0.30 | 120.00 |
| Xylene | | 33.80 | 1352.00 |
| Total | | 100.00 | 4000.00 |

Cure in the ratio 100:50 with Desmodur L 75

| | | |
|---|---|---|
| Desmophen 800 | Polyester polyol | Bayer AG |
| Desmophen 1100 | Polyester polyol | Bayer AG |
| CAB 381-0,5 | Cellulose acetobutyrate | Krahn Chemie |
| Mowilith 20 | Vinyl acetate homopolymer | Synthomer |
| Baysilone OL 17 | Polyether siloxane | Borchers |
| BYK 361 | Polyacrylate copolymer | Byk Chemie |
| Desmodur L 75 | Aromatic polyisocyanate | Bayer AG |

Determination of the Physico-chemical Properties

BET Surface Area

The BET surface area is determined with nitrogen in accordance with DIN 66 131.

Compacted Bulk Density

Determination of compacted bulk density by reference to DIN ISO 787/XI

Principles of Determining Compacted Bulk Density

The compacted bulk density (previously compacted bulk volume) equals the quotient of the mass and volume of a powder after tamping in a tamping volumeter under established conditions. According to DIN ISO 787/XI the compacted bulk density is stated in g/cm$^3$. Due to their very low compacted bulk density, the value for oxides is stated in g/l. Drying, screening and repetition of the tamping process are omitted.

Equipment for Determining Compacted Bulk Density

Tamping volumeter
Measuring cylinder
Laboratory balance (sensitive to 0.01 g)

Method for Determining Compacted Bulk Density

200±10 ml oxide are introduced into the measuring cylinder of the tamping volumeter such that no voids remain and the surface is horizontal.

The mass of the sample introduced into the cylinder is determined to an accuracy of 0.01 g. The measuring cylinder with the sample is placed in the measuring cylinder holder in the tamping volumeter and tamped 1250 times.

The volume of the tamped oxide is read off to an accuracy of 1 ml.

Evaluating the Compacted Bulk Density Determination $$\text{Compacted bulk density (g/l)} = \frac{\text{g weighed amount} \times 1000}{\text{ml volume read off}}$$

pH

The pH is determined in a 4% aqueous dispersion, in water:methanol 1:1 in the case of hydrophobic oxides.

Reagents for Determining pH
Distilled or demineralized water, pH>5.5
Methanol, reagent grade
Buffer solutions pH 7.00 pH 4.66

Equipment for Determining pH
Laboratory balance, (sensitive to 0.1 g)
Beaker, 250 ml
Magnetic stirrer
Magnetic rod, length 4 cm
Combined pH electrode
pH meter
Dispensette, 100 ml Procedure for Determining pH The determination is performed by reference to DIN/ISO 787/IX:

Calibration: Before measuring the pH the meter is calibrated with the buffer solutions. If several measurements are performed successively, a single calibration is sufficient.

4 g hydrophilic oxide are placed in a 250 ml beaker with 96 g (96 ml) water using a Dispensette and, with the pH electrode immersed, stirred for five minutes with a magnetic stirrer (speed approx. 1000 rpm).

4 g hydrophobic oxide are mixed into a paste with 48 g (61 ml) methanol in a 250 ml beaker and the suspension diluted with 48 g (48 ml) water and, with the pH electrode immersed, stirred for five minutes with a magnetic stirrer (speed approx. 1000 rpm).

After turning off the stirrer the pH is read after a standing time of one minute. The result is expressed to one decimal place.

Loss on Drying

In contrast to the weighed amount of 10 g as stated in DIN ISO 787 II, a weighed amount of 1 g is used to determine the loss on drying.

The cover is fitted before cooling. A second drying stage is not performed.

Avoiding dust formation, approx. 1 g of the sample is weighed to an accuracy of 0.1 mg into a weighing pan with a ground-glass cover, said pan having been dried at 105° C., and dried in a drying oven for two hours at 105° C. It is reweighed after being cooled in the desiccator over blue gel with the lid in place.

$$\% \text{ loss on drying at } 105° \text{C.} = \frac{\text{g weight loss}}{\text{g weighed amount}} \times 100$$

The result is expressed to one decimal place.

Ignition Loss

Equipment for Determining Ignition Loss
Porcelain crucible with crucible lid
Muffle furnace
Analytical balance (sensitive to 0.1 mg)
Desiccator Method for Determining Ignition Loss Deviating from DIN 55 921, 0.3-1 g of the un-predried substance is weighed to an accuracy of 0.1 mg into a previously ignited porcelain crucible with crucible lid and ignited for 2 hours at 1000° C. in a muffle furnace.

Care should be taken to avoid dust formation. It has proven favorable for the weighed samples to be placed into the muffle furnace when it is still cold.

The slow heating of the furnace avoids any major air turbulence in the porcelain crucible.

Once a temperature of 1000° C. is reached, ignition is continued for a further 2 hours. The crucible is then covered with a lid and the weight loss determined over blue gel in the desiccator.

Evaluating the Ignition Loss Determination

Since the ignition loss relates to the sample dried for 2 h at 105° C., the following calculation formula is obtained:

$$\% \text{ ignition loss} = \frac{m_0 \times \frac{100 - LOD}{100} - m_1}{m_0 \times \frac{100 - LOD}{100}} \times 100$$

$m_0$=weighed amount (g)
LOD=loss on drying (%)
$m_1$=weight of ignited sample (g)
The result is expressed to one decimal place.

DBP Number

Equipment for Determining DBP Number
Balance with top pan
Plastic beaker (250 ml)
Brabender plastograph with metering unit Reagent
Dibutyl phthalate (tech.)

Method
1. Checking the cutoff point
Switch on the plastograph without the metering pump.
Open the protective cover for the control panel (under the display)
Press the "Func" key: the display alternates between the cutoff value "1000" and the alarm "AI H.A."; after 5 sec. the display returns to normal mode.
2. Calibration
Switch on the plastograph without the metering pump.
Switch on the kneader (press both start buttons simultaneously).
With the "Cal" key pressed down, press the "Funk" key once; the display alternates between the current zero point and "Lo S.C.".
Press the "Cal" key again; after four seconds (calibration) the instrument displays the current total range "10000" and "Fu S.C.".
Press the "Cal" key again; after four seconds (calibration) the instrument displays the friction-corrected zero point "tare".
Press the "Cal" key again and wait for 5 sec.
If necessary carry out the "Cutoff point" and "Calibration process" steps once a day before measurements.
3. Measurement
12.5 g of the sample are weighed into a plastic beaker and poured into the mixing chamber. If instructed, a different weighed amount can also be used (e.g. 8 or 20 g). The DBP metering unit is switched on. As soon as the filling process has been completed (display F), the plastograph is ready for operation.
Start the measurement by pressing the start buttons simultaneously.
The metering unit delivers 4 ml DBP/min until the preset cutoff point (1000) is reached.
The device switches off automatically.
The consumption of DBP can then be read from the display of the metering unit.

Calculation $$DBP (\%) = \frac{\text{Metering unit display} \times 1.047 \times 100}{\text{Weighed amount (g)}}$$

Always give the result with the weighed amount.

The invention claimed is:

1. An aerogel-type, structured silica, characterized in that it is surface-modified with silanes, silazanes or siloxanes and wherein the aerogel-type, structured silica has a BET surface of from 80 to 450 m2/g, a bulk density of from 10 to 60 g/l, a DBP number of from 200 to 400 g/l/100 g and a pH of from 6 to 8.

2. A process for the production of the aerogel-type, structured silica according to claim 1, comprising preparing an aerogel-type, structured silica from pyrogenic silica, then spraying the aerogel-type, structured silica with the silanizing agent, post-mixing and conditioning the mixture.

3. The process according to claim 2, wherein the aerogel-type, structured silica has a BET surface of from 80 to 450 m2/g, a bulk density of from 10 to 60 g/l, a DBP number of from 200 to 400 g/l/100 g and a pH of from 6 to 8.

4. The process according to claim 3, wherein preparing includes incorporating 5 to 50% by weight water into air dispersed pyrogenic silica with uniform dispersion and drying the powdered mixture obtained.

5. The aerogel-type, structured silica product obtainable by the process according to claim 2.

6. The process for the production of the aerogel-type, structured silica according to claim 2, further comprising spraying the aerogel-type, structured silica with water or with acidified water before spraying with the silanizing agent.

7. The process for the production of the aerogel-type, structured silica according to claim 2, wherein the silanizing agent is dissolved in a solvent.

* * * * *